United States Patent
Campagnuolo et al.

(10) Patent No.: US 6,172,486 B1
(45) Date of Patent: Jan. 9, 2001

(54) BATTERY LIFE EXTENDER WITH ENGINE HEAT

(75) Inventors: Carl Campagnuolo, Potomac; James J. Chopack, Columbia; Jonathan E. Fine, Silver Spring, all of MD (US)

(73) Assignee: The United States of America as represented by the Secretary of the Army, Washington, DC (US)

( * ) Notice: Under 35 U.S.C. 154(b), the term of this patent shall be extended for 0 days.

(21) Appl. No.: 09/405,122

(22) Filed: Sep. 24, 1999

(51) Int. Cl.⁷ .................................................. H01M 10/46
(52) U.S. Cl. ........................................... 320/141; 136/201
(58) Field of Search ................................. 320/141, 100, 320/159, DIG. 16, DIG. 22; 323/906

(56) References Cited

U.S. PATENT DOCUMENTS

| | | | |
|---|---|---|---|
| Re. 35,643 | * 10/1997 | Gali | 320/119 |
| 5,063,341 | * 11/1991 | Gali | 323/906 |
| 5,276,393 | * 1/1994 | Gali | 323/906 |
| 5,525,892 | * 6/1996 | Phommarath | 320/139 |
| 5,592,068 | * 1/1997 | Gregory et al. | 320/140 |
| 5,633,575 | * 5/1997 | Gali | 323/906 |
| 5,648,714 | * 7/1997 | Eryou et al. | 320/139 |
| 5,677,612 | * 10/1997 | Campagnuolo et al. | 320/141 |
| 5,705,770 | * 1/1998 | Ogasawara et al. | 320/101 |
| 5,744,935 | * 4/1998 | Khoury | 320/155 |
| 5,891,590 | * 10/1997 | King | 429/49 |
| 5,905,363 | * 12/1997 | Helbing et al. | 320/131 |
| 5,963,008 | * 3/1997 | Cordeiro et al. | 320/100 |
| 6,028,263 | * 4/1998 | Kobayashi et al. | 136/201 |

* cited by examiner

*Primary Examiner*—Peter S. Wong
*Assistant Examiner*—Pia Tibbits
(74) *Attorney, Agent, or Firm*—Paul S. Clohan, Jr.

(57) ABSTRACT

A lead acid battery life extender for the battery of an internal combustion engine includes a multivibrator circuit electrically connected across the terminals of the battery for delivering high frequency electrical pulses to the battery, thereby removing lead sulfate from the plates of the battery and increasing the life of the battery, and a thermoelectric power source for providing electrical energy to the multivibrator circuit, thermally coupled to heat emitted from the internal combustion engine and electrically connected to the multivibrator circuit.

2 Claims, 6 Drawing Sheets

BATTERY LIFE EXTENDER WITH ENGINE HEAT

RIGHTS OF THE UNITED STATES GOVERNMENT

The invention described herein may be manufactured, used and licensed by or for the United States Government for governmental purposes without payment to us of any royalty thereon.

BACKGROUND OF THE INVENTION

A. Field of the Invention

The present invention relates to the field of lead-acid battery life extension. The invention addresses the problem of reduced lifetime of secondary lead-acid batteries that are used intermittently. The invention has widespread military and non-military applications.

B. Description of the Prior Art

Present lead-acid battery life extension systems such as U.S. Pat. No. 5,677,612 to Campagnuolo, et al., and U.S. Pat. No. 5,063,341 to Gali, employ solar panels, which provide a voltage to a multivibrator (electronic oscillator). The multivibrator in turn provides a small energy pulse to the battery plates so that small amounts of lead sulfate are removed from the plates of the battery and go back into the electrolyte. In doing so doing the battery is rejuvenated or cleansed.

The problem with this technique is that one must use a solar panel which must be placed outside the battery compartment, i.e. on the roof of a vehicle, on the dashboard or in other areas where the sunlight can be collected and transformed into electrical energy to power the multivibrator. Wires must be routed from the solar panel through the vehicle cabin to the battery location. Other vehicles and equipment have two sets of batteries in parallel each set located on either side of the engine compartment. In this case wires to connect the two batteries in parallel must be routed through the engine compartment. In addition, solar panels are expensive and for a system such as a system described in U.S. Pat. No. 5,063,341 can account for more than half of the cost of the pulse system.

It is the purpose of the present invention to bring forth a system, which does not use solar panels to power the multivibrator. This system is not only low cost, but it is free of the problems mentioned above. The system will be placed under the hood of the vehicle adjacent to the battery compartment, or near the batteries when used in mechanized vehicles or power equipment.

SUMMARY OF THE INVENTION

The battery desulfator uses a thermoelectric device to extract electrical energy from the temperature difference between the vehicle engine and the ambient air. The electrical energy thus generated, passes through the multivibrator, which in turn delivers low power high frequency pulses to its lead plates. A resistance controls the amount of current from the thermoelectric device. A fuse is also utilized to prevent damage to the multivibrator circuit. The desulfator is active as long as the heat of the engine is of such a magnitude as to activate the thermoelectric device.

Several types of desulfators can be used; for instance, one version has the capability of varying the frequency of the output pulses proportionally to the state of charge of the battery.

Still other objects of the present invention will become readily apparent to those skilled in this art from the following description wherein, where there is shown and described a preferred embodiment of this invention, simply by way of illustration one of the modes to best carry out the invention. As it will be realized, the invention is capable of other different embodiments and its several details are capable of modification in various, obvious aspects all without departing from the invention. Accordingly, the drawings and descriptions will be regarded as illustrative in nature and not restrictive.

BRIEF DESCRIPTION OF THE DRAWINGS

A better understanding of the invention will be obtained when the following detailed description of the invention is considered in connection with the accompanying drawings in which.

DESCRIPTION OF THE PREFERRED EMBODIMENTS

Figure 1:
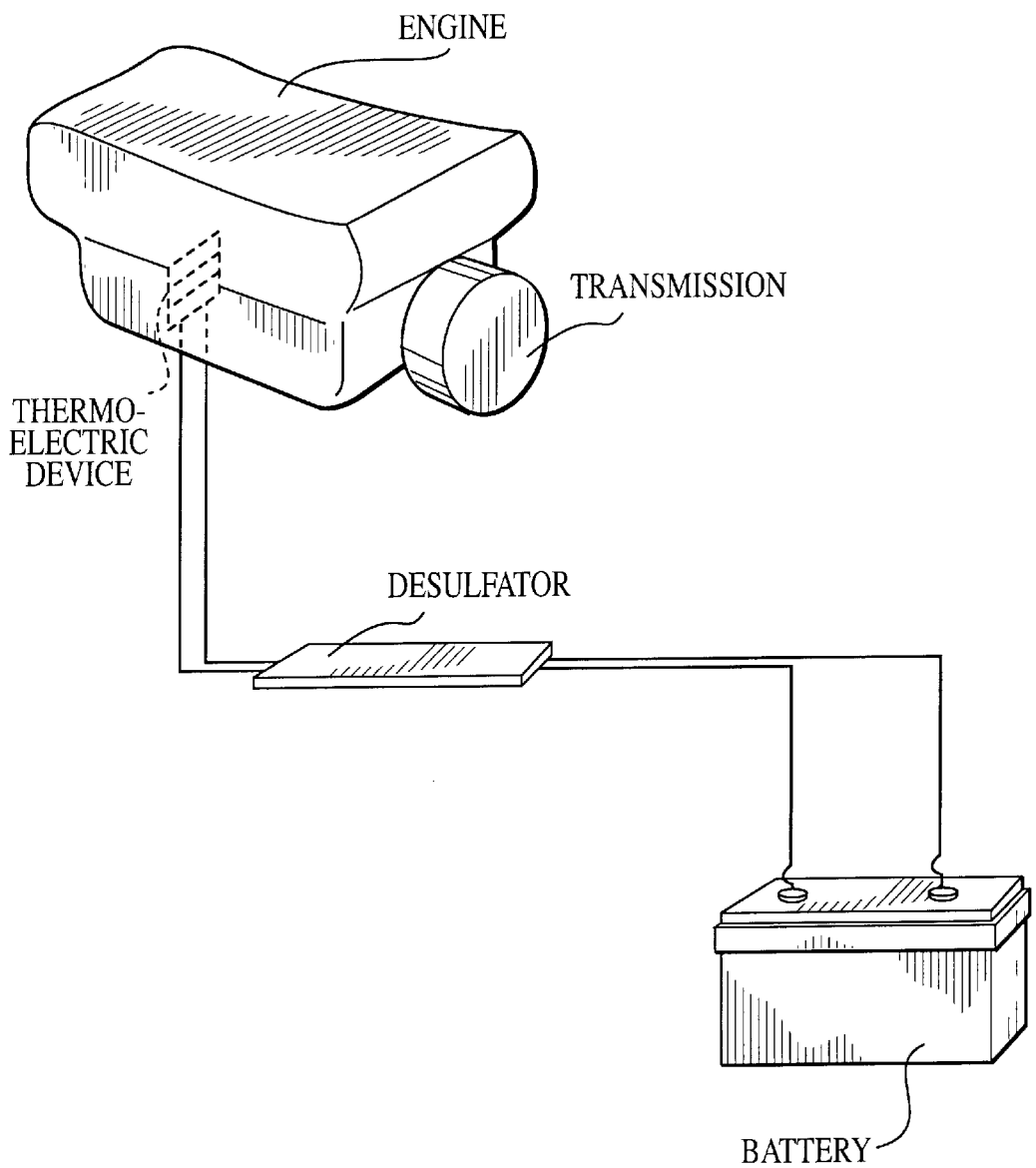
FIG. 1 shows a block diagram schematic of an embodiment of the present invention including a thermoelectric device coupled to an internal combustion engine of a motor vehicle.

Referring to FIG. 1, the battery desulfator operates by taking electrical energy from the thermoelectric device, which then passes through the oscillator or multivibrator, which in turn transforms the DC output of the thermoelectric device into high frequency pulses, which are fed through resistors and fuses (not shown in FIG. 1), which are present to avoid battery damage, should any component in the multivibrator fail.

Figure 2:
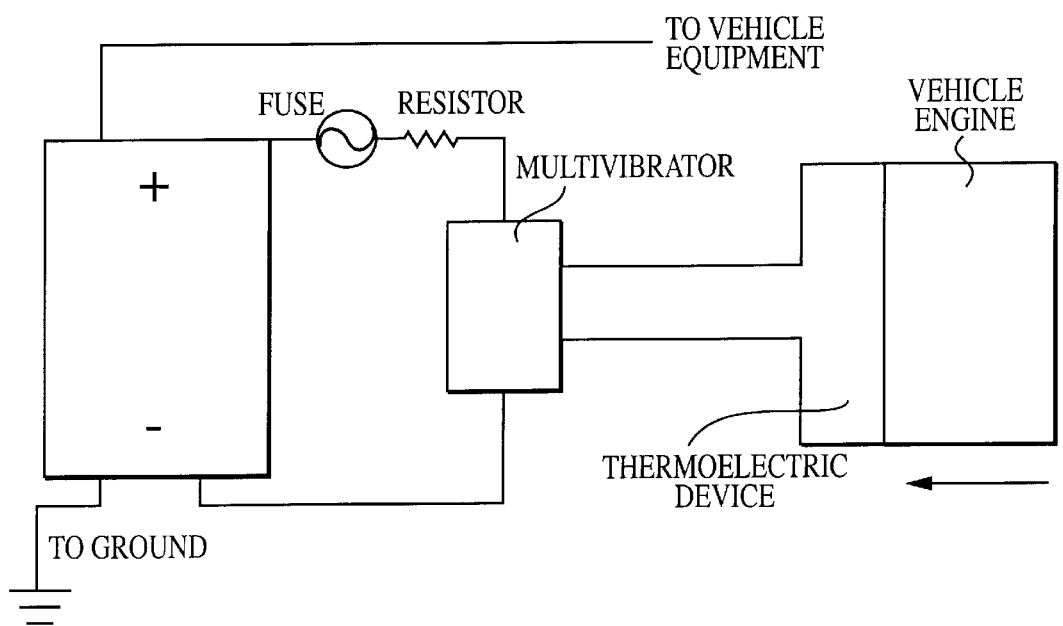
FIG. 2 shows a block diagram schematic of an embodiment of the present invention including a protective resistor and fuse.

FIG. 2 is a more detailed depiction in which a fuse and resistor are shown between the desulfator and the battery. Note the system will start operation when the engine reaches operating temperature and will cease operating when the engine temperature reaches a level below the triggering threshold of the thermoelectric generator.

Figure 3:
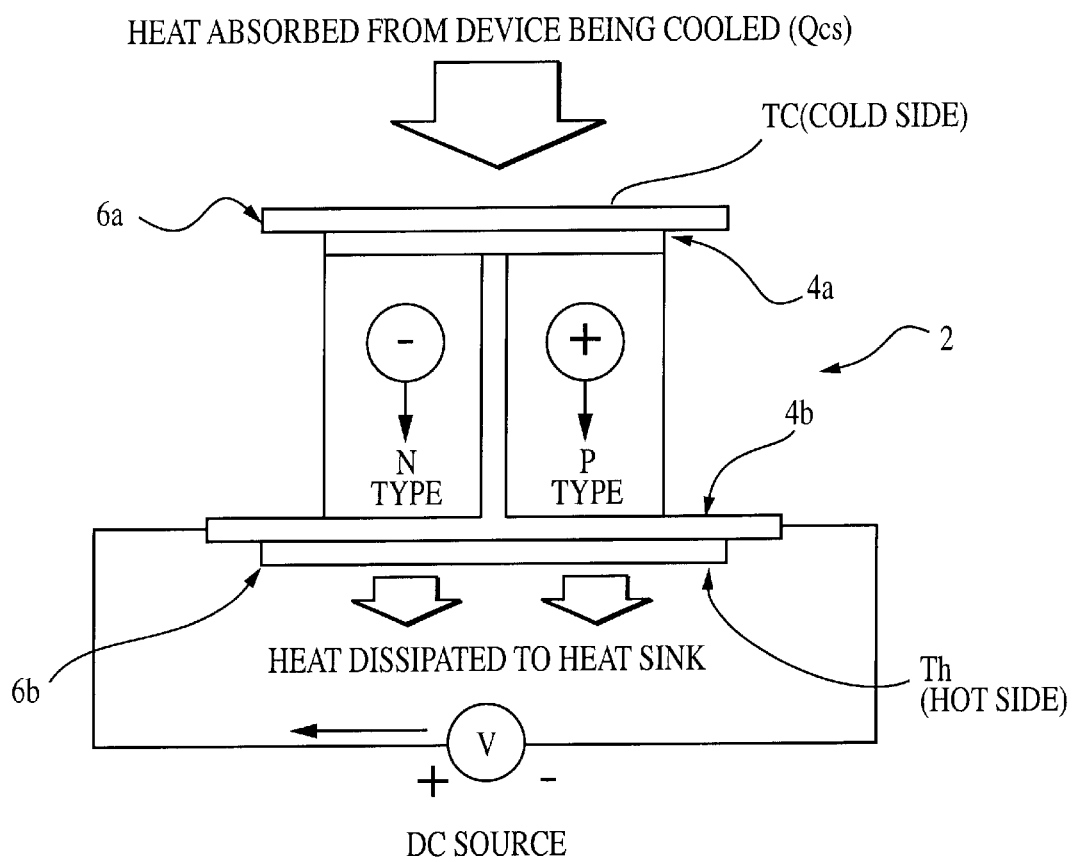
FIG. 3 is a side view of a thermoelelectric generator suitable for use in the present invention.

FIG. 3 shows the overall concept of heat movement with respect to a thermoelectric module. Thermoelectric modules are small solid state heat pumps that range in size from a thumbnail to over 2" square. These modules are capable of cooling, heating and generating power. They are similar to conventional refrigerators in that they move heat from one area to another, thus creating a temperature differential. Suitable thermoelectric modules are manufactured by the Tellurex Corporation, 1248 Hastings Street, Traverse City, Mich., USA 49686.

In particular, as shown in FIG. 3, a thermoelectric module 2 comprises two ceramic substrates sandwiching an array of semi-conductor couples (P and N pellets). The top ceramic substrate is formed by a metallization layer 4a and a top ceramic layer 6a. Similarly, the lower ceramic substrate is formed by a metallization layer 4b and a ceramic layer 6b. If a DC power source is connected to a thermoelectric module such as shown, heat is absorbed at one end (face or surface) of the device while rejected at the other end of the device. Thus, the face of the device where heat is absorbed becomes cool while the face where heat is rejected becomes hot. This is known as the Peltier effect. By reversing the current flow, the direction of the heat flow is reversed. With reference to the instant invention, the thermoelectric module can also generate electric power if a temperature gradient is maintained across the module and if the module is connected to an electrical load. This power generation aspect of the thermoelectric module is known as the Seebeck effect.

To dissipate excess heat generated by the thermoelectric module, and maintain a temperature differential between opposite sides of the module, temperature conductive fins made from aluminum, for example, may be attached to the "hot" face of the module.

Figure 4:
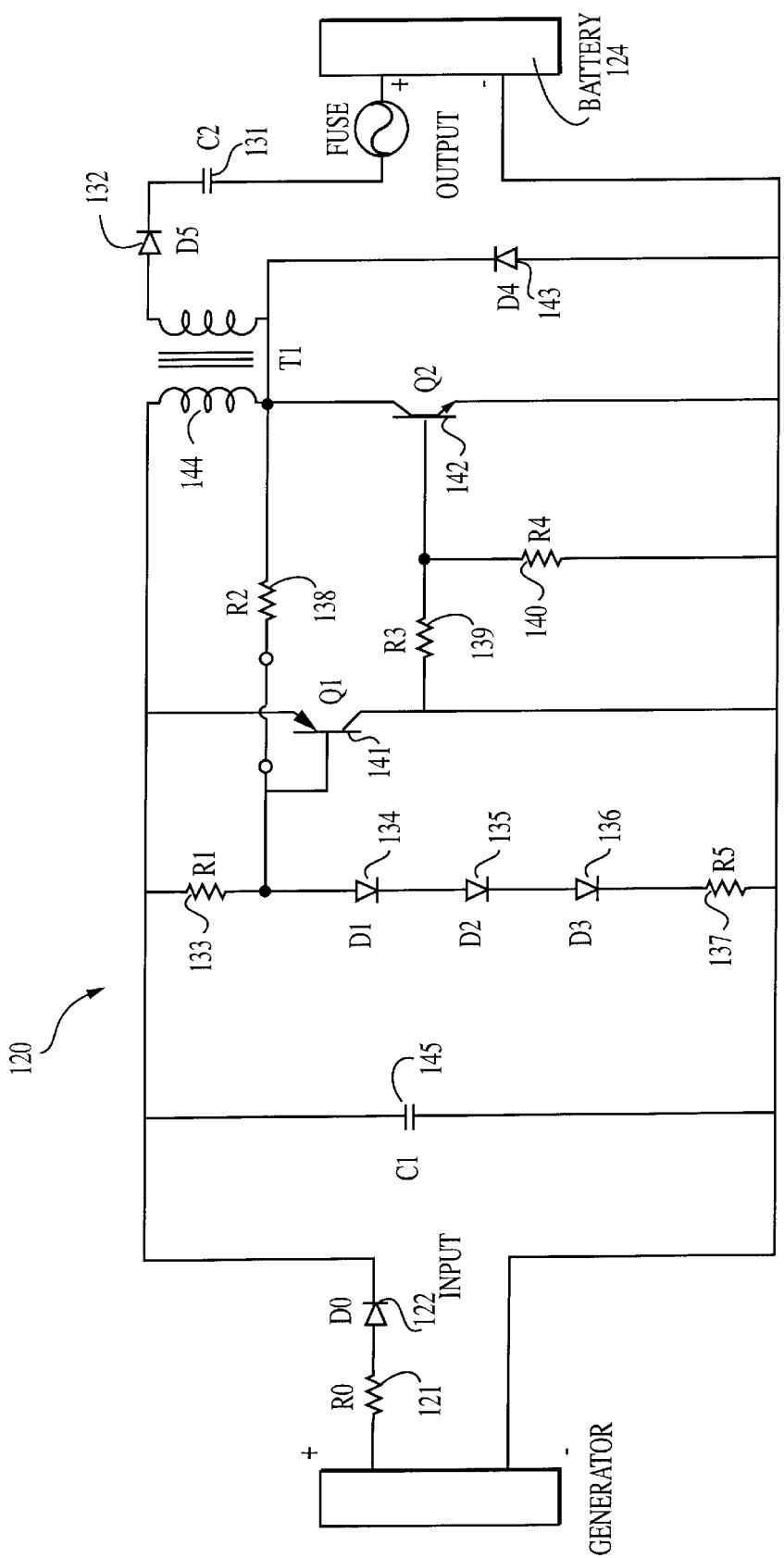
FIG. 4 is a schematic of an embodiment the present invention.

FIG. 4 shows a schematic diagram of a preferred embodiment of the present invention. The output voltage of thermoelectric generator (TEG) 130 is connected to the input of desulfator multivibrator 120. Thermoelectric generator 130 is connected through the resistor 121 and the regulator 122, which may be a diode, in a manner which will be familiar to those of ordinary skill in the art. Specifically, the positive of thermoelectric generator 130, after being regulated, is connected across capacitor 145 and through the primary coil of transformer 144 to the collector of NPN transistor 142 which has its emitter connected to the negative terminal of the battery 124. The positive terminal from thermoelectric generator 130 is also connected through resistor 121 and regulator 122 to the emitter of PNP transistor 141 and to the base of 141 via resistor 133, which has a serial connection through diodes 134, 135, and 136 and resistor 137 to the negative battery terminal. In addition, the collector of 142 is connected to the base of 141 through resistor 138 and the collector of 141 is connected to the base of 142 through the resistor configuration of 139 and 140. Diode 143 is connected across the collector emitter junction of 142 and the collector of 142 is connected to the primary side of the transformer through which diode 132 and capacitor 131 are serially connected back to the battery positive terminal. Capacitor 131 charges and discharges at a frequency determined by the circuit parameters of the multivibrator.

Figure 5:
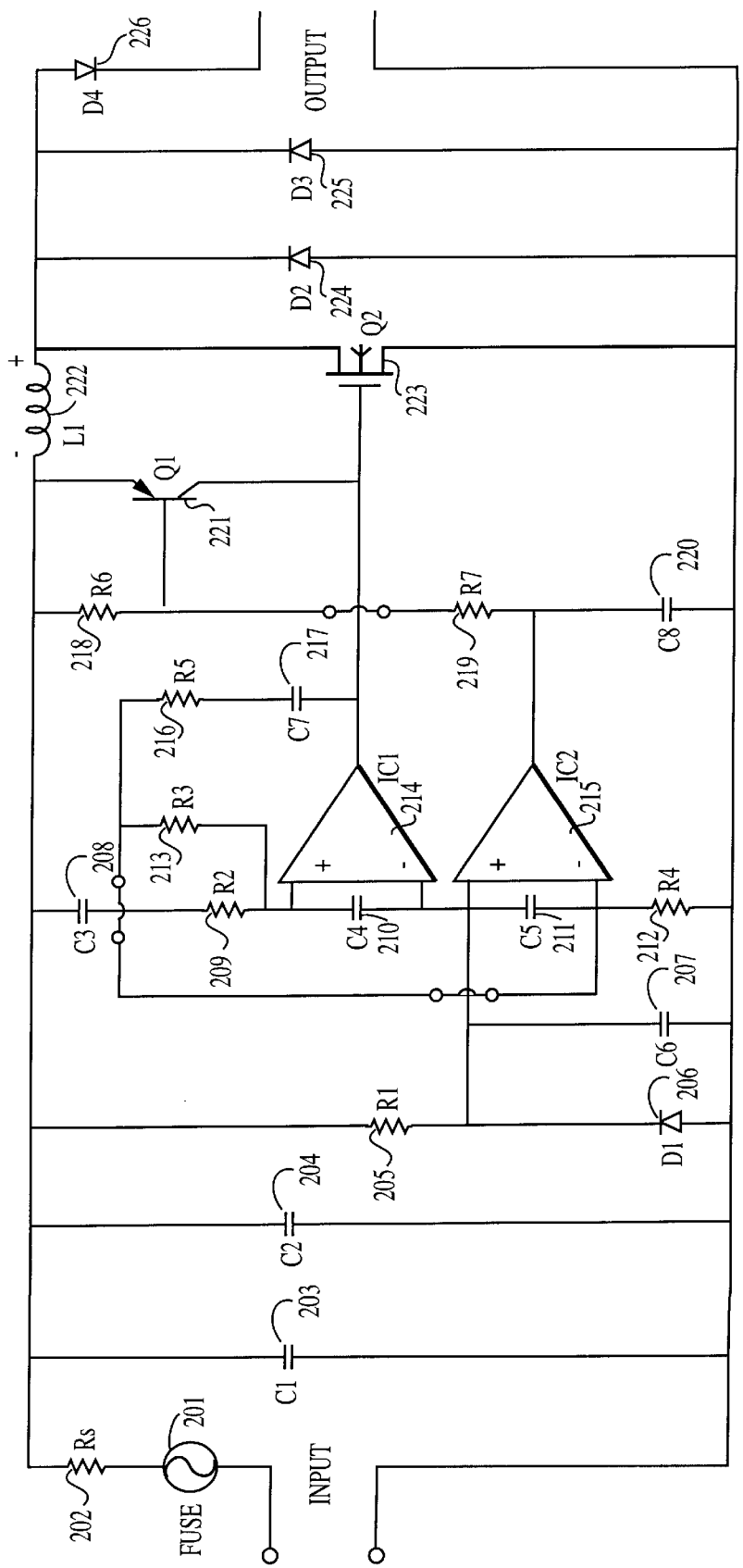
FIG. 5 is a schematic of an embodiment of the present invention that varies the frequency of the output pulses proportionally to the state of charge of the battery.
Figure 6:
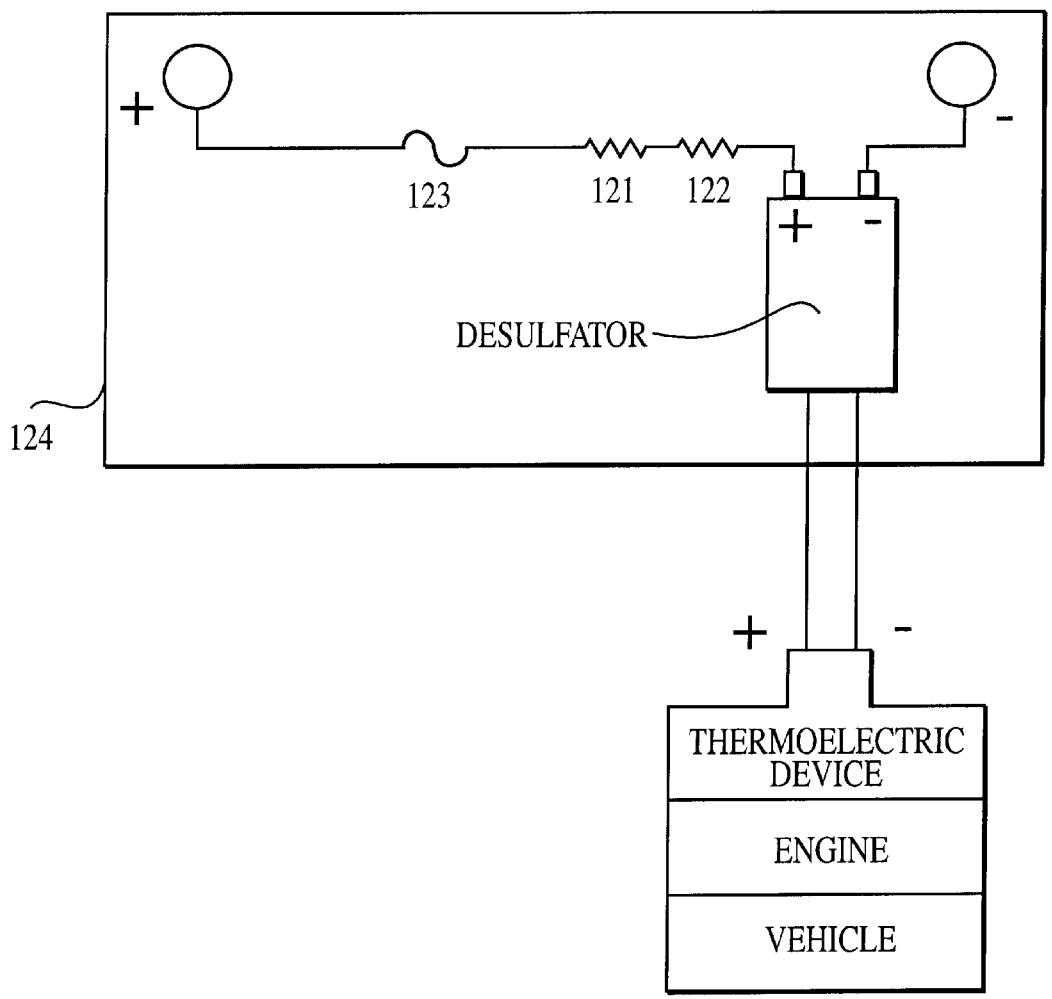
FIG. 6 shows an embodiment of the present invention placed inside an actual battery as an integral part of it.

Referring to FIG. 4 the circuit operates in the following manner. At a point in time when transistor 141 has just turned on and therefore is conducting current to its emitter-collector junction, the voltage drop across the emitter-collector junction is small and a large quantity of electrons flow through resistor 139 and into the base of transistor 142. This current will cause transistor 142 to turn on and open a path through its collector-emitter junction for electrons to flow. This causes electrons to flow through resistor 138, which in turn develops a large voltage drop across the primary coil of transformer 144. These current levels drain the capacitor 145 whose voltage level begins to drop quickly. As the voltage of capacitor 145 drops to a specific level, transistor 141 turns off; this action blocks the flow of electrons to transistor 142 and so 142 also turns off. This situation will cause a large change in voltage across the primary coil of the transformer 144, which is transformed on the secondary side to an even larger potential change. This momentary voltage change is representative of a pulse, which is delivered through diode 132 and capacitor 131 to the battery. The dispersal of the pulse allows capacitor 145 to charge slowly and when it reaches a voltage level large enough to turn 141 on again, the whole process repeats. This process continues at a rate of several thousand times per second. The desulfator will slowly charge a lead-acid battery while delivering a low power high frequency pulse to its lead plates. The application of high frequency pulses inhibits the formation of non-reactive lead sulfate on the plates of lead-acid SLI (Starting-Lighting-Ignition) batteries. The desulfator is always introducing power to the battery, and if the vehicle or other mechanized apparatus of which the lead-acid battery is associated is not started, then the desulfator will continue operating as long as the engine is hot and the heat is of level sufficient to trigger the thermoelectric generators. FIG. 5 is a schematic drawing of a desulfator with the capability of varying the frequency of the output pulses proportionally to the state of charge of the battery. The input and output of FIG. 5 are the same as the input and the output of FIG. 4. As the voltage drops across battery 124, the frequency increases. This effectively sweeps a larger range and is more likely to break down the various bonding states of the lead sulfate. Since the battery voltage level changes each time the car is started, and since the battery is slowly discharged when the motor is off, the use of the desulfator results in a practical method to minimize the lead sulfate problem. In FIG. 5, components 205 through 220 comprise the multivibrator circuitry that varies the frequency of the output pulses as the battery voltage changes. This is a standard circuit in the industry known to those practicing in this art. FIG. 6 shows the desulfator placed inside an actual battery 124 as an integral part of it. The desulfator-input voltage is derived from the vehicle engine through a thermoelectric generator.

Having thus shown and described what are at present considered to be preferred embodiments of the present invention, it should be noted that the same have been made by way of illustration and not limitation. Accordingly, all modifications, alterations and changes coming within the spirit and scope of the present invention are herein meant to be included.

What is claimed is:

1. A lead acid battery life extender for the battery of an internal combustion engine comprising:

a multivibrator circuit having an input port and an output port, the output port electrically connected to the terminals of a lead-acid battery for delivering high frequency electrical pulses to the lead acid battery, thereby removing lead sulfate from the plates of the lead acid battery and thereby increasing the life of the lead acid battery, and a thermoelectric power source for providing electrical energy to the multivibrator circuit, thermally coupled to heat emitted from the internal combustion engine and electrically connected to the input port of the multivibrator circuit, thereby providing power to the multivibrator circuit, thereby providing electrical power to the multivibrator circuit whenever the internal combustion engine reaches operating temperature and without discharging the lead acid battery.

2. A lead acid battery life extender according to claim 1, further comprising a housing in which the multivibrator and lead acid battery are integrally located.

* * * * *